Jan. 5, 1971 A. F. SCHROM 3,552,196
TEST STAND FOR VEHICLE ENGINES
Filed July 18, 1968 2 Sheets-Sheet 1
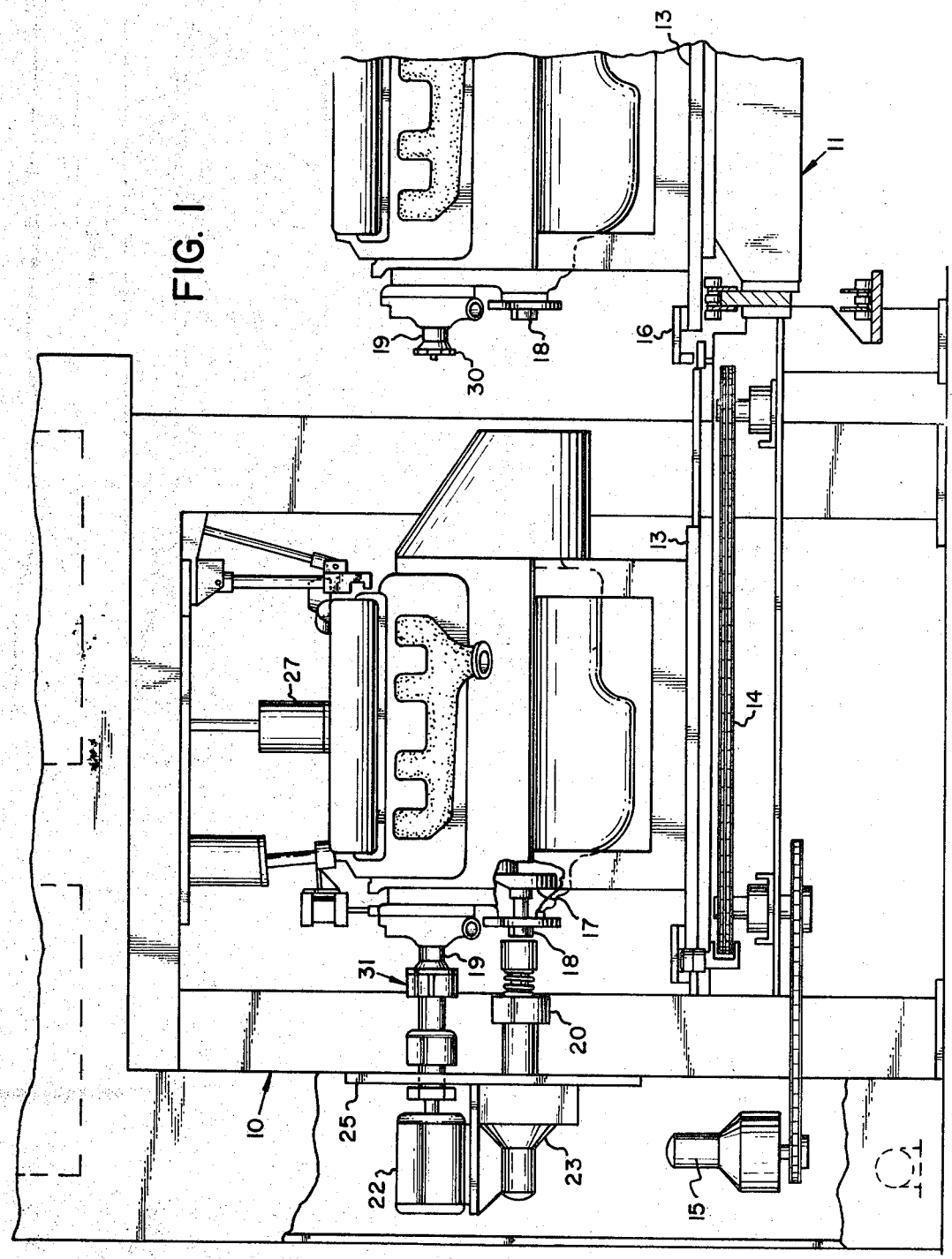
FIG. I
INVENTOR.
Andrew F. Schrom
BY
Gregory S. Dolgorukov
ATTORNEY

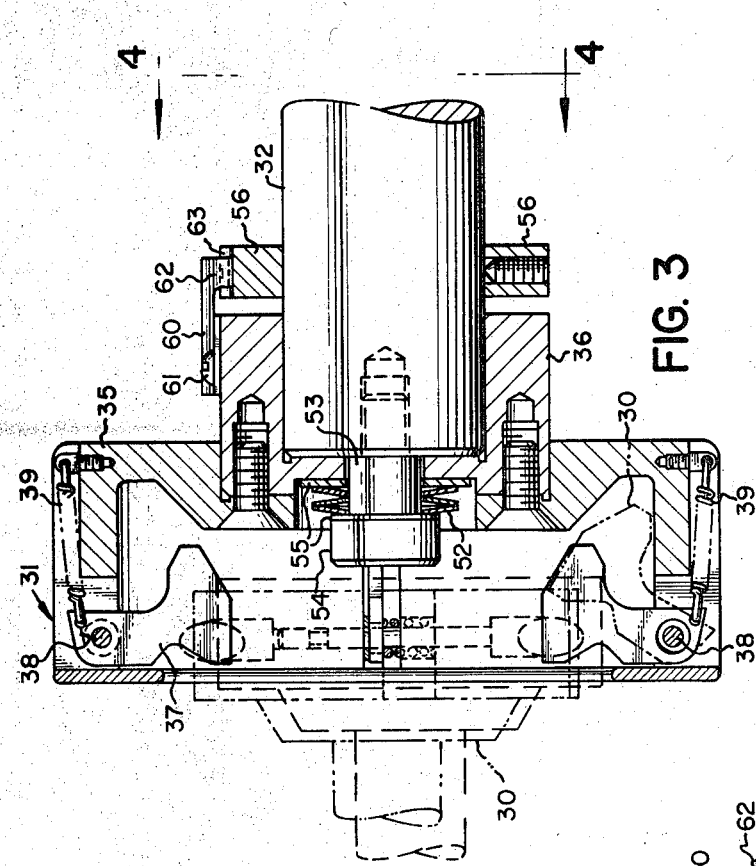

3,552,196
TEST STAND FOR VEHICLE ENGINES
Andrew F. Schrom, Livonia, Mich., assignor to Scans Associates, Inc., Livonia, Mich., a corporation of Michigan
Filed July 18, 1968, Ser. No. 745,926
Int. Cl. G01m 15/00
U.S. Cl. 73—117.2
7 Claims

ABSTRACT OF THE DISCLOSURE

The application discloses an improved test stand for motor vehicle engines, which stands receive test engines automatically and which includes a device for starting such engines from its front end by direct drive connection with its crankshaft. The invention solves the problem of testing simultaneously with the engine also its water pump, which testing had heretofore been considered impracticable due to wide variations of the distance between the center line of the crankshaft and of the water pump shaft and the resulting misregistry in the stand between the water pump driving means of the test stand and the water pump shaft of the test engine. The application discloses a connection bringing into axial registry only the crankshaft and the engine starting device and taking care of the resulting misregistry between the water pump shaft and its electric motor driving means by a coupling comprising only driving members contacting but not physically connected to the driven member on the water pump shaft.

---

This invention relates to systems for testing motor vehicle engines such, for instance, as that disclosed in the application of Vernon G. Converse III et al., Ser. No. 717,103, filed on Mar. 29, 1968 for Automation System and Method.

More particularly, the present application relates to an improved test stand forming a part of such system and adapted to receive test engines automatically, to locate them in place, to make all operative connections such as for fuel supply, removal of exhaust gases, and the like, and thereupon to start such an engine and to run it in accordance with the prescribed test procedure.

One of the difficulties encountered by those skilled in the art in providing such systems and constructing test stands therefor results from the fact that the water pump of the internal combustion engine which in such engine is driven by the engine itself, particularly from a crankshaft thereof with the aid of a pulley and V-belt, cannot be so driven in the process of the test, since speed requirements for testing the water pump are different from those of the engine. While the speed of the engine in the process of a test may be varied to check the responsiveness of the engine in acceleration and deceleration and the like, in order to have a meaningful test of the water pump such pump has to be run at a predetermined uniform speed for a prescribed period of time, and its delivery pressure, volume, and other feature of performance be measured. While several such periods at different speeds may be prescribed, each must be of a certain prescribed duration during which certain conditions must be stabilized.

In other words, other means than the test engine itself must be used for driving the pump in a test stand. However, an attempt to use any extraneous driving means gives rise to another difficult problem making use of such means not practical as explained below. Such difficulty proved to be in making connection between such extraneous driving means and the water pump after the engine is set in place in a test stand. A test stand designed for safe and efficient operation is usually adapted to receive the test engine moving from a conveyor transversely thereof into the test stand with the front end of the engine leading, i.e. going in first. Such an arrangement has been considered by those skilled in the art to be more safe and advantageous since the various service devices could be located at the terminal or closed end of the test stand and be installed therein in a more reliable manner than it could be done at the open or receiving end of the stand.

As the engine moves into the test stand and stops therein at a predetermined position, its parts come into registry with the service devices such as fuel supply means, a starting device and a water pump driving means. Some of such connections and particularly, fuel, water and exhaust gas connections are stationary, do not rotate or transmit power, and any misregistry therein resulting from manufacturing variations from engine to engine can be taken care of by thicker resilient gaskets and similar means. However, power-transmitting connections, connection particularly driving between the engine crankshaft to the shaft of the starting device, as well as connection of the water pump shaft to the drive shaft of the electric motor require special care. The engine starting device is usually taken as a basic or starting line of registry, since considerable power and very high starting torque is required to start the engine from its forward end of the crankshaft, with the shaft of the water pump coming into what may be termed as the "resulting registry," i.e. in such registry of the axis of the water pump shaft and the axis of the driving shaft of the motor as results from the construction of the engine and manufacturing variations therein.

As mentioned, in an engine operatively installed in a motor vehicle, the water pump is driven from a pulley mounted on the front end of the engine crankshaft with the aid of a rubber V-belt; such V-belt may also drive other devices having similar pulleys thereon, such as a generator, with adjusting means being provided for tightening or loosening the V-belt. Because of such a construction, the distance between the respective axes of the crankshaft and the water pump need not be maintained within close tolerances. Accordingly, the tolerances specified for the engine parts determining variation in such distance are not intended to maintain such distance substantially uniform with only small variations. As a result, difference in such distance from engine to engine may be very considerable, and it is not uncommon to have it vary as much as half an inch.

In view of such a condition the test engine moving into the test stand and set therein in a position to have its crankshaft in substantially exact registry with the drive shaft of the engine starting device may have the water pump shaft out of registry with the drive shaft of the water pump driving motor for as much as ¼" and even more making it very difficult, and sometimes impossible, to provide a reliable driving connection between such shafts.

Attempts to drive the water pump with such a severe axial misalignment between the connected shafts bring severe strains on the connecting devices, often causing their destruction only after a few hours of operation and also subjecting the test engine and the test stand itself to severe vibrations. Particularly, the extensive experimental use of resilient couplings of various constructions, such as those including rubber members, proved to be particularly vulnerable to such severe axial misalinement since their rubber members would heat and disintegrate after a very short period of use.

As a result it became necessary to exclude the water pump from the devices to be tested in an engine in the process of testing such engine in a test stand. In acccordance with the present practice the water pump is disconnected from the crankshaft of the engine by removing the V-belt and the driving pulleys from the crankshaft and the water pump, which usually necessitates removing the fan also, and leaving the water pump stationary during the test, with cooling water being circulated through the cooling system of the engine with the aid of other means. While such test procedure has to be used by necessity, it gives rise to various difficulties such as requiring testing the water pump separately before it is assembled with the engine, and subjecting the engine to additional test to determine operativeness of its water pump in a complete assembly or leaving such engine without such test and accepting consequences thereof.

One of the objects of the present invention is to provide an improved test stand for internal combustion engines of motor vehicles whereby the above difficulties and disadvantages are overcome and largely eliminated, and the water pump of an internal combustion engine is tested in a desired manner while testing the engine in a test stand, irrespective of the degree of practically encountered misalinement between the shaft of the water pump and the shaft of the driving device thereof.

Another object of the invention is to provide an improved test stand for internal combustion engines of motor vehicles in which the water pump is tested at any desired speed indicative of its performance and independently of the speed of the engine.

Another object of the present invention is to provide an improved test stand for motor vehicle engines which accepts engines for test, irrespective of the degree of axial misalinement of their water pump shafts with the driving motor shaft and operates quietly and without imposing strains on the system, common in conventional constructions and endangering the test installation as well as the test procedure and reliability of the test results.

Still another object of the present invention is to provide an improved driving connection between the shafts in severe axial misalinement which connection adequately compensates for such misalinement and transfers the driving torque from one shaft to the other at considerable speeds.

A further object of the invention is to provide an improved driving connection of the character specified in the preceding paragraph, improved means being provided therein to prevent damage to the pump and/or its driving device, when the pump fails and "freezes."

A still further object of the present invention is to provide a construction such as specified in the preceding paragraph, including improved means giving a signal in case of interference with transmission of driving torque from the drive shaft to the water pump shaft either because of "freezing" of the water pump or because of any other cause.

A further object of the present invention is to provide a construction of the foregoing nature which is relatively simple in construction, is safe and dependable in operation and is relatively inexpensive to manufacture and to service.

Further objects and advantages of this invenititon will be apparent from the following description and appended claims, reference being had to the accompanyig drawings forming a part of this specification, wherein like reference characters designate corresponding parts in the several views.

FIG. 1 is a fragmentary elevational view showing a test stand and a portion of the conveyor adjacent thereto, with a test engine shown set in place in the stand and ready for starting.

FIG. 2 is an end view of the coupling drivingly connecting the driving shaft of the electric motor with the driven shaft of the water pump.

FIG. 3 is a sectional view taken in the direction of the arrows on the section plane passed through the line 3—3 of FIG. 2 and showing the coupling in longitudinal cross-section.

FIG. 4 is an end view taken in the direction of the arrows from the line 4—4 of FIG. 3.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Referring specifically to the drawings and more particularly to FIG. 1 thereof, the numeral 10 designates generally the test stand operatively arranged adjacent the conveyor 11. The test engine, generally designated by the numeral 12, is shown set in place in the stand 10 after having been moved, together with its adaptor or pallet 13, from the conveyor 11, transversely thereof, into the stand. Moving the test engine from the conveyor into the stand is attained with the aid of chain-and-sprocket means, generally designated by the numeral 14, operated with the aid of a motor 15 to draw test engines into the stand with the aid of a hook means 16 automatically as a part of a test cycle.

The above means and the operative cycle including removed of the test engine from the conveyor and setting it in a test stand, making all required connections, testing the engine by running it under its own power in accordance with the established test procedure, disconnecting service devices and returning the engine to the conveyor, are all described in detail in said co-pending application of Vernon G. Converse III et al. and, therefore, any further detailed description thereof is not believed to be necessary herein.

As indicated in FIG. 1 and particularly in the righthand portion thereof wherein a test engine is shown still on the conveyor, for the purposes of the test, the pulley provided on the front end of the crankshaft and the pulley provided on the front end of the water pump shaft together with the fan assembly and the V-belt connecting such pulleys are removed, thus disconnecting drivingly the crankshaft and the water pump shaft of the engine. As the engine is moved into the test stand with its front end leading, i.e. moving in first, a hexagon head screw 18, provided on the front end of the crankshaft 17, comes into registry with the connecting device 20 of the engine starting device but not yet into an engagement therewith. The front end 19 of the water pump comes into resulting registry with the coupling connected to an electric motor 22 comprising a water pump driving device. The connecting device 20 of the engine starting device is driven with the aid of an air motor 23. The engine starting device and the water pump driving device are secured to the mounting plate 25 and are supported thereby.

As shown in FIG. 1, when the test engine 12 is located in place in the stand, it is still disengaged from the engine starting device but is engaged to the water pump driving device. In such a position of the test engine various service connections, such as fuel supply means 27, water supply connection, exhaust gases removal connection, and other service connections are made, thus making the test engine 12 ready for starting.

While the crankshaft 17 of the test engine 12 comes in the test stand into proper registry with the shaft of the air motor 23 and with the connecting device 20 interposed between said shafts, the spider member 30 provided on the end of the water pump shaft for driving the fan is usually out of registry. Thus, although the water pump becomes connected to the electric motor 22 as soon as the engine is located in place in the stand, such misregistry may be very substantial, making it impractical to transmit driving torque from the electric motor 22 to the water pump with the aid of conventional means. Attempts to do so using devices such as couplings or universal joints in which the driving shaft and the driven shaft are connected with conventional yielding means such as as rubber bushings, and the like, proved to be impracticable.

It should also be understood that in test stands of the nature described herein the misalinement of the shafts is usually not angular but is axial, i.e. with the respective axes being substantially parallel to each other but offset from each other for considerable distance.

In accordance with the present invention, there is provided an improved coupling device, generally indicated in the drawings by the numeral 31, cooperating with the parts of the test engine and of the test stand and whereby transmission of driving torque under such conditions presents no particular difficulties.

In accordance with the invention, the coupling 31 engages the spider 30 of the water pump to drive the same. The driving connection therebetween is only a driving connection but not a physical connection in the sense that would make the connected parts a unitary structure. In accordance with the invention the spider 30 of the water pump shaft and the coupling 31 mounted on the driving shaft 32 of the electric motor can be separated by hand when moved apart in the axial direction.

By virtue of such a construction, any practically encountered misalinement of the shafts is absorbed by the coupling merely by the relative sliding between the prongs or outward projections of the spider member provided on the water pump shaft and the driving blades of the coupling.

Referring specifically to FIGS. 2–4, the spider member 30 retained for the purposes of the test on the water pump shaft has a plurality of outwardly extending projections. The coupling engaging the water pump shaft spider 30 comprises a hollow cylindrical body 35 having a rearward extension 36 mounted on the end of the shaft 32 of the electric motor 22 and secured thereto for driving. Thus, the cylindrical housing 35 is drivingly connected to the shaft 32 and rotates therewith.

Within the hollow cylindrical body 35 there are mounted a plurality, in the present embodiment four, of driving blades 37 to extend radially toward the central line of the body 35. The driving blades 37 are hingedly mounted for limited rotation and rocking on the hinge shafts 38. The driving blades 37 are mounted at their outward ends and extend inwardly, with their inner ends being free. Tension springs 39 operate to keep said blades in straight radial positions such as indicated in FIGS. 2 and 3 in full lines.

It will now be clear in view of the foregoing that should a blade 37 meet axial resistance at its inner end, such end thereof will rotate around the shaft 38 moving away from the center line of the drive shaft 32 and assume position such as shown in phantom lines at the bottom of FIG. 3. In moving into such a position, the blade 37 will yield to an obstruction, usually a prong of the spider 30, permitting the same to pass through.

The mounting of the blades 37 is such that said blades may also rock on their mounting shafts 38 sidewise and, therefore, yield to the driving torque beyond a predetermined maximum. Such a construction is attained by making the holes, through which shafts 38 pass, larger than the diameters of the shafts, permitting a blade 37 to rock on the shaft, i.e. to deviate from a strict radial position. Such deviation is resiliently opposed by the compression springs 45 mounted on the shafts 38.

FIG. 2 shows engagement between the water pump spider member 30 and the coupling 31. The spider 30 is shown in heavy dotted lines as being in full registry with the center line of the coupling (a condition rarely attained). The misregistry of the connected shaft results in the relative position of the coupling 31 and of the spider member 30 such as indicated in phantom lines. As indicated in FIG. 2 at 50, the prong of the spider member 30 engages the blade 37 considerably further outwardly, while the opposite projection of the spider member 30 has moved inwardly and engages its respective blade 37 much closer to the inner end thereof. With misregistry being along the line of two opposite projections of the spider member 30, the engagement of the other projections with their respective blades does not result in position of the prongs on their respective blades in the radial direction.

It will now be understood that in driving a water pump in a test stand there are constant relative movements between the blades 37 of the coupling 31 and the projections of the spider member in the radial direction, with such blades also rocking sidewise. It has been found by actual use of applicant's device that misalinement of the drivingly connected shafts of as much as ⅜" is absorbed by the costruction disclosed above and does not interfere with the test.

It will also be understood that while driving connection between the engine starting device and the engine is not made until all service connections are made, the water pump driving connection is fully accomplished as soon as the test engine is located at a predetermined position in the test stand. Should in making such engagement the blades 37 meet a prong of the spider 30, no breakage or impact would occur since the blades 37 will move into their retracted positions, such as one indicated at the lowermost blade in FIG. 3 in phantom lines, and a proper engagement will be made. Should because of particularly large misalinement one or more prongs of the spider 30 not clear its respective blade 37, as soon as rotation begins the connection will be completed.

The electric motor 22 is started at desired time independently of the crankshaft of the engine, and may be started either before or after starting of the engine. Any desired procedure of testing the water pump may be used. Should it be desired to change the speed of the water pump during the test, a suitable rheostat may be provided for changing the speed of the motor.

Means are provided to prevent breakage or other injury to the connected devices should the water pump fail such, for instance, as by freezing of its shaft. In accordance with the invention, means are provided to permit rotation of the coupling and to give an audible signal of such a condition.

In accordance with the invention, a friction clutch comprising a plurality of Belleville spring washers 52 is provided on the screw 53 threaded into the end of the shaft 32, as shown, and providing by its head 54 an abutment for the spring washers 52. Protective washers 55 are provided on both sides of the Belleville spring washers 52. The degree of compression of the Belleville spring washers 52 determines the maximum torque transmitted from the shaft 32 to the coupling 31.

As illustrated in FIGS. 3 and 4, means are provided to give an audible signal should the coupling 31 begin to rotate independently of the shaft 32 because of the slippage of the friction clutch. Said means are exemplified by a ring 56 secured for rotation with the shaft 32 adjacently the extension 36 secured for rotation to the coupling 31. A spring 60 secured with the aid of screws 61 to the extension 56 has a free end 62 adapted to snap successively into recesses 63 on the ring 56. Should the coupling and therefore the extension 36 thereof begin rotating independently of the shaft 32, snapping of the spring end 62 into the recesses 63 causes loud chatter giving proper signal of the above-explained condition. Such a condition may be cured by switching off the electric motor 22 and without discontinuing the test of the test engine and its remaining portions.

By virtue of the above-disclosed construction, the objects of the invention listed above and numerous additional advantages are attained.

I claim:

1. A test stand for running testing of automobile engines, said stand having a motor with a shaft and coupling means for starting the engine at the front end of its crankshaft, and a second motor having a second shaft and a second coupling for driving, during the test, the engine water pump; wherein the improvement comprises, means for delivering the test engines to said stand with the front end of the crankshaft adjacent to the starting shaft, and said coupling means attached to the end of said starting shaft for driving engagement of the crankshaft by the starting shaft substantially at the periphery of said end, and a driving spider affixed to the water pump shaft outside of the water pump housing, said driving spider having radially extending projections, and said second coupling means attached to the water pump driving shaft and being larger than said driving spider and having projections from its periphery extending radially inward for radially sliding driving engagement with said driving spider so that said second coupling means overcomes any axial misalinement between said driving spider and said water pump driving shaft.

2. A test stand for running testing of automobile engines, said stand having a motor with a shaft and coupling means for starting the engine at the front end of its crankshaft and a second motor having a second shaft and a second coupling for driving, during the test, the engine water pump; wherein, in order to avoid the results of axial misalinements of the engaging shafts due to variations in test engines of the distance between the axes of the crankshaft and the shaft of the water pump, the improvement comprises, means for delivering the test engines to said stand with the front end of the crankshaft adjacent to the starting shaft, and said coupling means attached to the end of said starting shaft for driving engagement of the crankshaft by the starting shaft, and a driving spider affixed to the water pump shaft outside of the water pump housing, said driving spider having radially extending projections, and said second coupling means attached to the water pump driving shaft and being larger than said driving spider and having fingers extending from its periphery radially inward for radially sliding driving engagement with said driving spider so that said second coupling means overcomes any axial misalinement between said driving spider and said water pump driving shaft by relative sliding at the mutually engaging surfaces of said spider projections and said fingers in delivering driving torque and thus compensating for the axial misalinement.

3. The construction defined in claim 2, with the fingers of said second coupling being resiliently yielding in the axial direction to provide for engagement under conditions when said fingers abut said spider projections.

4. The construction defined in claim 2, with said second coupling comprising a hollow cylindrical housing mounted for rotation with the water pump driving shaft, and with the radially extending fingers thereof mounted for limited resilient movement by their outer ends and engaging with their inner ends for transmission of driving torque the outward projections of the spider carried by the water pump shaft.

5. The construction defined in claim 2, with the spider carried by the water pump shaft being formed by the member originally provided thereon for driving the fan of the engine.

6. The construction defined in claim 2 and including a frictional clutch adapted to transmit the water pump driving torque but adapted to slip when the water pump shaft offers a stronger than normal resistance, and a spring-pressed member on said second coupling with a plurality of indentations being provided on the driving shaft, with said member being adapted to give audible signal when the frictional clutch is slipping.

7. The construction defined in claim 6 and including a plurality of Belleville washers and a threaded member adapted to extend adjustable pressure thereon to provide for adjusting the maximum torque transmittable thereby.

References Cited
UNITED STATES PATENTS

| | | | |
|---|---|---|---|
| 1,262,151 | 4/1918 | Werner | 64—14 |
| 2,135,634 | 11/1938 | Byrom | 64—14 |
| 2,884,113 | 4/1959 | Converse et al. | 198—19 |
| 3,208,316 | 9/1965 | Schribner | 64—30 |

FOREIGN PATENTS

| | | | |
|---|---|---|---|
| 180,387 | 4/1966 | Russia | 73—117.3 |

JAMES J. GILL, Primary Examiner

M. SMOLLAR, Assistant Examiner